United States Patent

Peng et al.

(10) Patent No.: US 10,164,539 B1
(45) Date of Patent: Dec. 25, 2018

(54) POWER CONVERSION SYSTEM WITH CLAMP MODE SWITCHING

(71) Applicant: Chicony Power Technology Co., Ltd., New Taipei (TW)

(72) Inventors: Tso-Jen Peng, New Taipei (TW); Ping-Sheng Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/803,299

(22) Filed: Nov. 3, 2017

Related U.S. Application Data

(60) Provisional application No. 62/537,588, filed on Jul. 27, 2017.

(51) Int. Cl.
*H02M 7/217* (2006.01)
*H02M 3/335* (2006.01)

(52) U.S. Cl.
CPC ... *H02M 3/33507* (2013.01); *H02M 3/33546* (2013.01); *H02M 3/33569* (2013.01); *H02M 3/33592* (2013.01)

(58) Field of Classification Search
CPC .............. H02M 7/217; H02M 3/33507; H02M 3/33569; H02M 3/33546; H02M 3/33592
USPC .............. 323/125–127; 363/125–127, 89–90
See application file for complete search history.

(56) References Cited

U.S. PATENT DOCUMENTS

| | | | | |
|---|---|---|---|---|
| 5,872,705 A | * | 2/1999 | Loftus, Jr. ......... | H02M 3/33569 363/127 |
| 5,991,171 A | * | 11/1999 | Cheng ............... | H02M 3/33507 363/21.03 |
| 6,961,253 B1 | * | 11/2005 | Cohen .................... | H02M 1/08 363/89 |
| 8,669,744 B1 | * | 3/2014 | Vinciarelli .......... | H02M 3/1582 323/235 |
| 9,780,635 B1 | * | 10/2017 | Lam ..................... | H02M 1/00 |
| 2007/0086217 A1 | * | 4/2007 | Zhang ................ | H05B 41/2827 363/17 |
| 2017/0264206 A1 | * | 9/2017 | Rana .................... | H02M 1/083 |

FOREIGN PATENT DOCUMENTS

| | | |
|---|---|---|
| TW | 521481 B | 2/2003 |
| TW | 201440404 A | 10/2014 |
| TW | 201547173 A | 12/2015 |

\* cited by examiner

*Primary Examiner* — Adolf Berhane
*Assistant Examiner* — Nusrat Quddus
(74) *Attorney, Agent, or Firm* — Muncy, Geissler, Olds & Lowe, P.C.

(57) ABSTRACT

A power conversion system with clamp mode switching includes a clamp conversion circuit, a switching circuit module, a PWM control module, and a feedback control module. The PWM control module stabilizes a feedback voltage when the feedback control module feeds the feedback voltage back to the switching circuit module and the PWM control module. The switching circuit module switches the clamp conversion circuit to operate in an active clamp mode or a non-active clamp mode.

9 Claims, 6 Drawing Sheets

POWER CONVERSION SYSTEM WITH CLAMP MODE SWITCHING

BACKGROUND

Technical Field

The present disclosure relates to a power conversion system with clamp mode switching, and more particularly to a power conversion system with clamp mode switching between an active clamp mode and a non-active clamp mode.

Description of Related Art

With the rapid development of power electronics, the power converter applied to the power conversion system is more and more widely used. In particular, the current electronic products are increasingly based on high power density, high reliability, small size, and high efficiency. In the power conversion system, the flyback converter is the most common because of advantages of isolated circuit, simple topology, and low cost. The power conversion system with the flyback converter is classified as the power conversion system with an active clamp flyback converter and the power conversion system with a passive clamp flyback converter (also referred to as "non-active clamp flyback converter").

In general, two switch units are used in the active clamp flyback converter, wherein one is referred to as an auxiliary switch unit for the clamp control and the other is referred to as a main switch unit for the power conversion control so that an input power source is converted into an output power source by an electromagnetic coupling. However, the passive clamp flyback converter does not have the auxiliary switch unit. Hence, the passive clamp flyback converter uses a passive diode to provide the clamp operation and uses a main switch unit to convert the input power source into the output power source. In particular, since the active clamp flyback converter can provide a zero voltage switching (ZVS) operation, a heavy-loading efficiency of the active clamp flyback converter is higher than that of the passive clamp flyback converter. However, a light-loading efficiency of the active clamp flyback converter is lower than that of the passive clamp flyback converter since larger resonant current needs to be kept to meet the ZVS operation of the active clamp flyback converter, thereby causing more copper losses and iron (core) losses in the light-loading condition.

SUMMARY

In order to solve the above-mentioned problems, the present disclosure provides a power conversion system with clamp mode switching. The power conversion system includes a clamp conversion circuit, a switching circuit module, a pulse-width modulation control module, and a feedback control module. The clamp conversion circuit operates in an active clamp mode or a non-active clamp mode. The switching circuit module is coupled to the clamp conversion circuit. The pulse-width modulation control module is coupled to the switching circuit module and the clamp conversion circuit. The feedback control module is coupled to the switching circuit module, the pulse-width modulation control module, and the clamp conversion circuit. When the feedback control module transmits a feedback voltage to the switching circuit module and the pulse-width modulation control module, the pulse-width modulation control module stabilizes the feedback voltage, and the switching circuit module switches the clamp conversion circuit to operate in the active clamp mode or the non-active clamp mode according to the feedback voltage.

In one embodiment, the switching circuit module includes a switching unit, and the switching unit is coupled to the clamp conversion circuit. When the feedback voltage is at a light-loading condition, the switching circuit module disables the switching unit so that the clamp conversion circuit operates in the non-active clamp mode.

In one embodiment, the power conversion system further includes a peak detection module, and the peak detection module is coupled to the switching circuit module. When the feedback voltage is at the light-loading condition and the peak detection module detects an upper peak value, the switching circuit module enables the switching unit to switch the clamp conversion circuit operating from the non-active clamp mode to the active clamp mode.

In one embodiment, the power conversion system further includes an upper peak detection module, and the upper peak detection module is coupled to the peak detection module. The upper peak detection module transmits the upper peak value to the peak detection module according to a switch current of the clamp conversion circuit.

In one embodiment, the peak detection module includes a voltage control module and a voltage determination module. The voltage control module is coupled to the clamp conversion circuit. The voltage determination module is coupled to the voltage control module and the switching circuit module. The voltage control module detects the upper peak value and transmits a voltage signal to the voltage determination module, and the switching circuit module enables or disables the switching unit according to a determination result generated from the voltage determination module.

In one embodiment, the voltage control module includes a first voltage control unit and a second voltage control unit. The first voltage control unit is coupled to the clamp conversion circuit and the switching circuit module. The second voltage control unit is coupled to the clamp conversion circuit and the switching circuit module. When the voltage control module detects the upper peak value, both the first voltage control unit and the second voltage control unit are not conducted.

In one embodiment, the voltage determination module includes a first comparison unit, a second comparison unit, and a delay module. The first comparison unit is coupled to the voltage control module and the switching circuit module. The second comparison unit is coupled to the voltage control module. The delay module is coupled to the second comparison unit and the switching circuit module. When the voltage control module detects the upper peak value, the first comparison unit outputs a first enabled signal according to the voltage signal, and the second comparison unit outputs a second enabled signal through the delay module. The switching circuit module enables the switching unit according to the first enabled signal and the second enabled signal.

In one embodiment, when the voltage control module detects a lower peak value, the first comparison unit outputs the first enabled signal, and the second comparison unit outputs a delay enabled signal through the delay module. The switching circuit module disables the switching unit according to the first enabled signal and the delay enabled signal.

In one embodiment, the first comparison unit provides a first reference voltage, and the second comparison unit provides a second reference voltage. The first reference voltage is greater than the second reference voltage.

In one embodiment, when the voltage control module detects the upper peak value, the voltage control module controls the voltage signal to be between the first reference voltage and the second reference voltage.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1A:
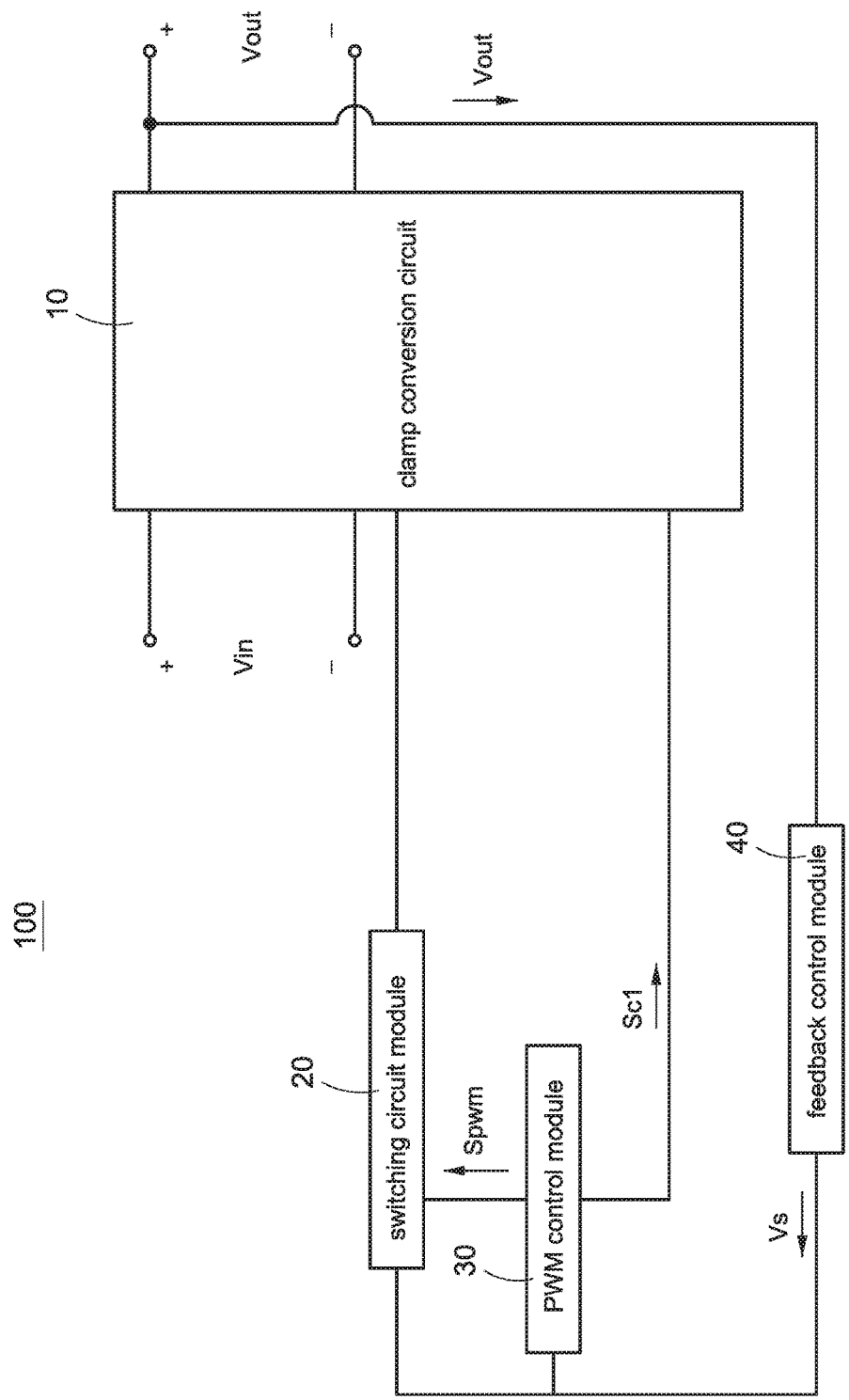
FIG. 1A is a schematic block diagram of a power conversion system according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1A, which shows a schematic block diagram of a power conversion system according to a first embodiment of the present disclosure. The power conversion system 100 includes a clamp conversion circuit 10, a switching circuit module 20, a pulse-width modulation control module 30 (hereinafter referred to as "PWM control module 30"), and a feedback control module 40. The clamp conversion circuit 10 receives an input power source Vin and converts the input power source Vin into an output power source Vout. In particular, the clamp conversion circuit 10 can operate in an active clamp mode or a non-active clamp mode. The switching circuit module 20 and the PWM control module 30 are coupled to the clamp conversion circuit 10, and the switching circuit module 20 is coupled to the PWM control module 30. The feedback control module 40 is coupled to the switching circuit module 20, the PWM control module 30, and the clamp conversion circuit 10. When the feedback control module 40 receives the output power source Vout, the feedback control module 40 transmits a feedback voltage Vs to the switching circuit module 20 and the PWM control module 30. The PWM control module 30 stabilizes the feedback voltage Vs and produces a first control signal Sc1 and a pulse-width modulation signal Spwm (hereinafter referred to as "PWM signal Spwm") according to the feedback voltage Vs. The first control signal Sc1 is outputted to the clamp conversion circuit 10 and the PWM signal Spwm is outputted to the switching circuit module 20. The switching circuit module 20 receives the feedback voltage Vs and the PWM signal Spwm, and controls the clamp conversion circuit 10 according to the feedback voltage Vs and the PWM signal Spwm. The clamp conversion circuit 10 converts the input power source Vin into the output power source Vout according to the first control signal Sc1 and switching operations of the switching circuit module 20, thereby switching the clamp conversion circuit 10 operating in the active clamp mode or the non-active clamp mode.

Figure 1B:
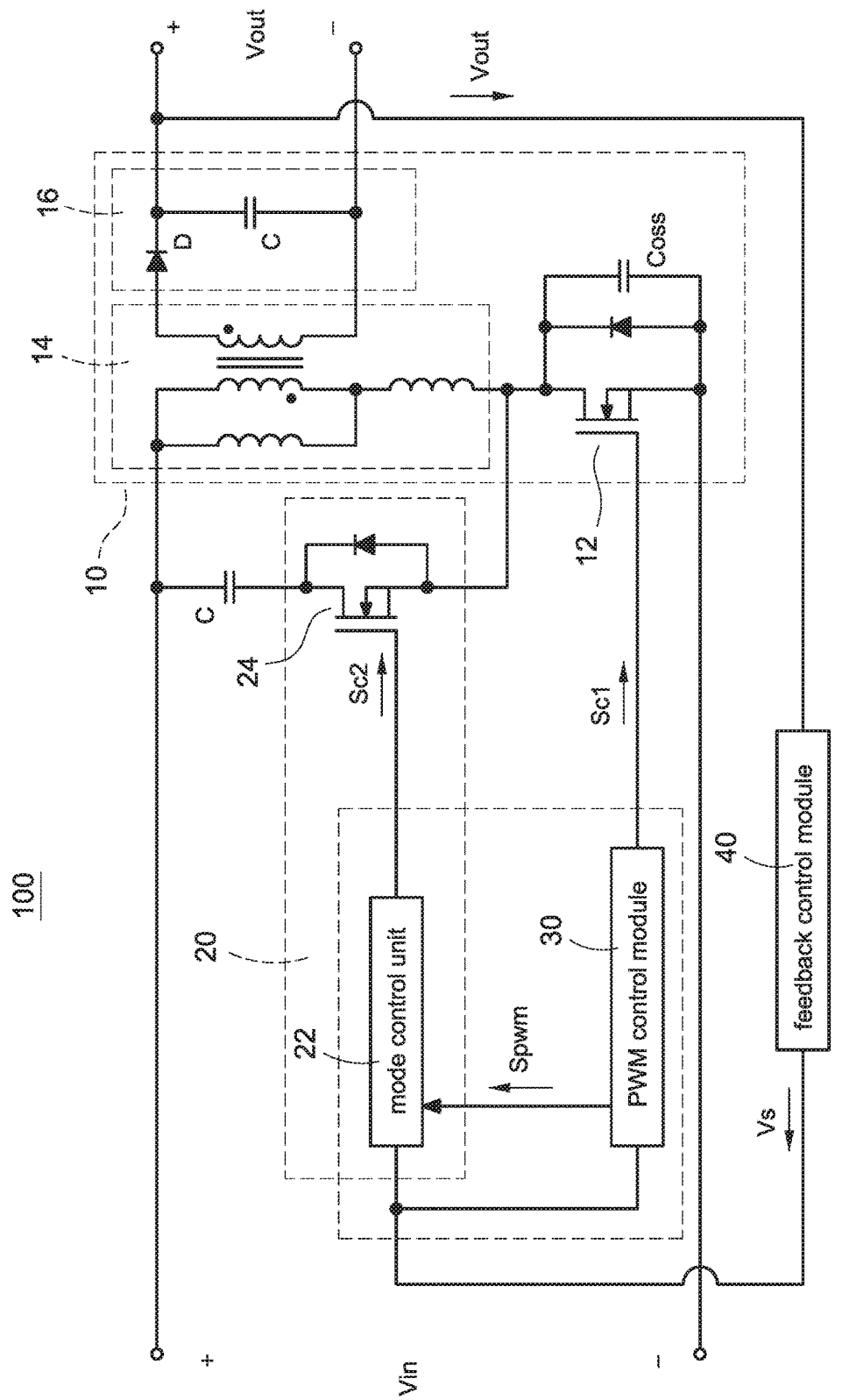
FIG. 1B is a detailed circuit block diagram in FIG. 1A.

Please refer to FIG. 1B, which shows a detailed circuit block diagram in FIG. 1A. Also refer to FIG. 1A, the clamp conversion circuit 10 includes a first switching unit 12, a transformer unit 14 with a primary side and a secondary side, and a rectifying and filtering unit 16. The primary side of the transformer unit 14 receives the input power source Vin, and is coupled in parallel to the switching circuit module 20 and coupled in series to the first switching unit 12. The secondary side of the transformer unit 14 is coupled to the rectifying and filtering unit 16, and the output power source Vout is outputted from the rectifying and filtering unit 16. The rectifying and filtering unit 16 is coupled to the feedback control module 40 and outputs the output power source Vout to the feedback control module 40. Since the connection relationship among the switching circuit module 20, the PWM control module 30, and the feedback control module 40 is identical to that shown in FIG. 1A, the detail description is omitted here for conciseness. The switching circuit module 20 includes a mode control unit 22 and a second switching unit 24. The mode control unit 22 is coupled to the PWM control module 30, the feedback control module 40, and the second switching unit 24. The mode control unit 22 produces a second control signal Sc2 and outputs the second control signal Sc2 to the second switching unit 24 according to the PWM signal Spwm. Also, the mode control unit 22 outputs or does not output the second control signal Sc2 to enable or disable the second switching unit 24 according to the feedback voltage Vs. The second switching unit 24 is coupled in parallel to the primary side of the transformer unit 14 and receives the second control signal Sc2. The clamp conversion circuit 10 converts the input power source Vin into the output power source Vout according to the first control signal Sc1 and the second control signal Sc2. In one embodiment, the mode control unit 22 and the PWM control module 30 may be, for example but not limited to, integrated into a single integrated circuit (IC) or made of electronic components.

When the clamp conversion circuit 10 receives the input power source Vin, the input power source Vin is converted into the output power source Vout by switching operations of the first switching unit 12 and the second switching unit 24 and electromagnetic coupling between the primary side and the secondary side of the transformer unit 14, and the output power source Vout is outputted from the secondary side of the transformer unit 14. The feedback control module 40 converts the output power source Vout into the feedback voltage Vs, and outputs the feedback voltage Vs to the PWM control module 30 and the mode control unit 22 of the switching circuit module 20. The PWM control module 30 produces the first control signal Sc1 and the PWM signal Spwm according to the feedback voltage Vs, and outputs the first control signal Sc1 to control the switching operation of the first switching unit 12. The mode control unit 22 determines whether the output power source Vout is at a light-loading condition according to the feedback voltage Vs, and therefore disables or enables the second switching unit 24. More specifically, when the mode control unit 22 detects that the output power source Vout is at the light-loading condition according to the feedback voltage Vs, the mode control unit 22 disables the second switching unit 24 so that the clamp conversion circuit 10 operates in the non-active clamp mode. When the mode control unit 22 detects that the output power source Vout is at an over light-loading condition according to the feedback voltage Vs, the mode control unit 22 converts the PWM signal Spwm into the second control signal Sc2 and outputs the second control signal Sc2 to control (turn on and turn off) the second switching unit 24, and therefore the clamp conversion circuit 10 operates in the active clamp mode. In this embodiment, the light-loading condition is defined as that the loading is less than or equal to 25% and the over light-loading condition is defined as that the loading is greater than 25%. However, the light-loading condition and the over light-loading condition would be adjusted according to actual situations.

Moreover, when the mode control unit 22 detects that the output power source Vout is at the light-loading condition according to the feedback voltage Vs, the mode control unit 22 does not output the second control signal Sc2 to the second switching unit 24, thereby turning off the second switching unit 24. When the second switching unit 24 is turned off, the energy (power) is delivered through a diode (not labeled) or a body diode coupled in parallel to the second switching unit 24. Therefore, when the clamp conversion circuit 10 operates in the non-active clamp mode, the second switching unit 24 may be regarded as a passive diode. When the mode control unit 22 detects that the output power source Vout is at the over light-loading condition according to the feedback voltage Vs, the mode control unit 22 outputs the second control signal Sc2 to the second switching unit 24. At this condition, the second switching unit 24 switches according to a duty cycle of the PWM of the second control signal Sc2. Therefore, when the clamp conversion circuit 10 operates in the active clamp mode, the second switching unit 24 may be regarded as an active switch. Accordingly, the clamp conversion circuit 10 can operate either in the non-active clamp mode due to the light-loading condition or in the active clamp mode due to the over light-loading condition, thereby increasing overall operation efficiency of the clamp conversion circuit 10.

Figure 2A:
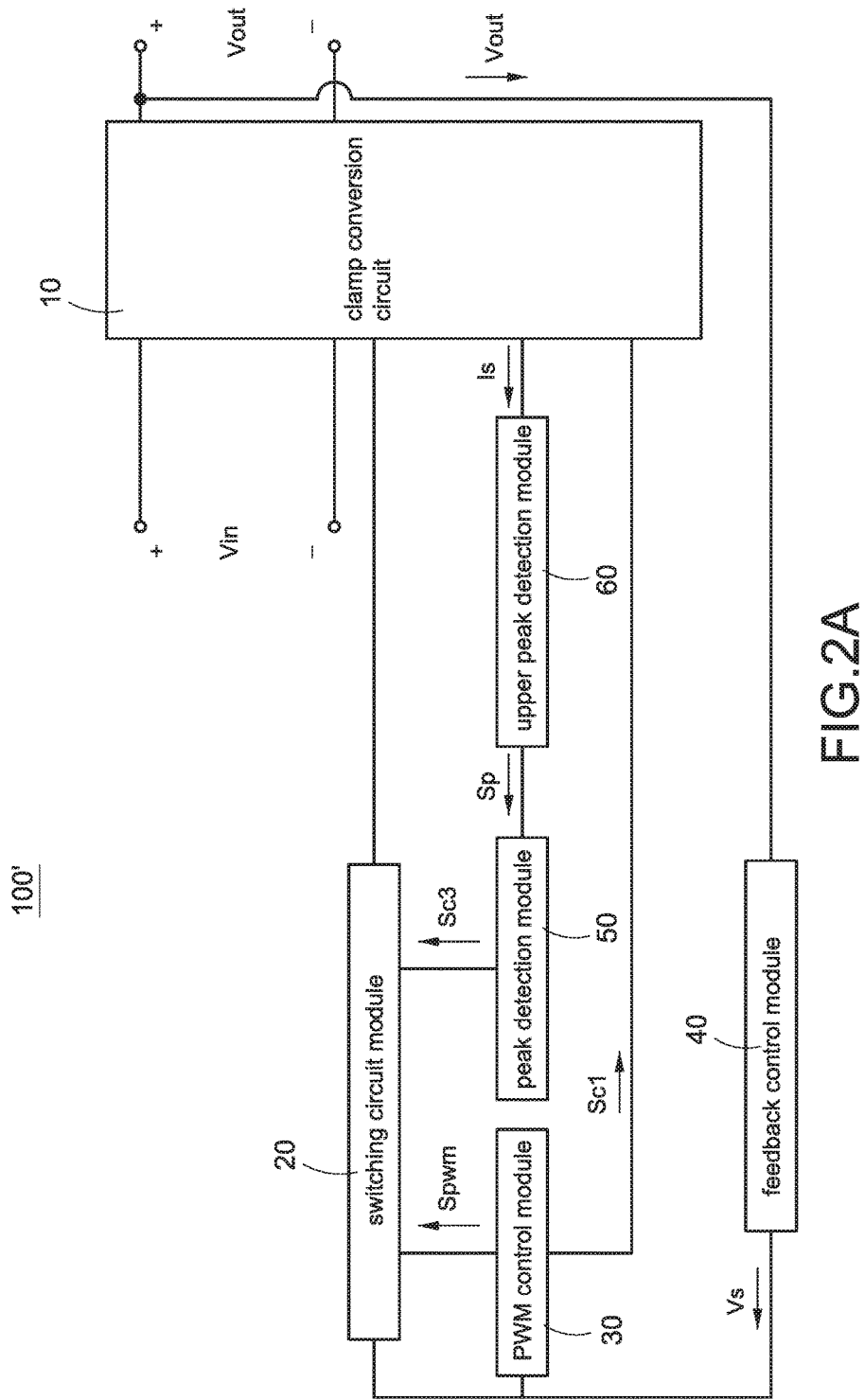
FIG. 2A is a schematic block diagram of the power conversion system according to a second embodiment of the present disclosure.

Please refer to FIG. 2A, which shows a schematic block diagram of the power conversion system according to a second embodiment of the present disclosure. Also, refer to FIG. 1A and FIG. 1B again. The major difference between the power conversion system 100' shown in FIG. 2A and the power conversion system 100 shown in FIG. 1A is that the former, namely the power conversion system 100' further includes a peak detection module 50 and an upper peak detection module 60. The peak detection module 50 is coupled to the switching circuit module 20 and the upper peak detection module 60, and the upper peak detection module 60 is coupled to the clamp conversion circuit 10. The upper peak detection module 60 transmits a pulse signal Sp to the peak detection module 50 according to a switch current Is of the clamp conversion circuit 10, and the peak detection module 50 outputs a third control signal Sc3 to the switching circuit module 20 according to the pulse signal Sp. The switching circuit module 20 receives the feedback voltage Vs, the PWM signal Spwm, and the third control signal Sc3, and controls the clamp conversion circuit 10 according to the feedback voltage Vs, the PWM signal Spwm, and the third control signal Sc3. Since the connection relationship and signal transmission among the clamp conversion circuit 10, the switching circuit module 20, the PWM control module 30, and the feedback control module 40 are identical to that shown in FIG. 1A, the detail description is omitted here for conciseness.

Figure 2B:
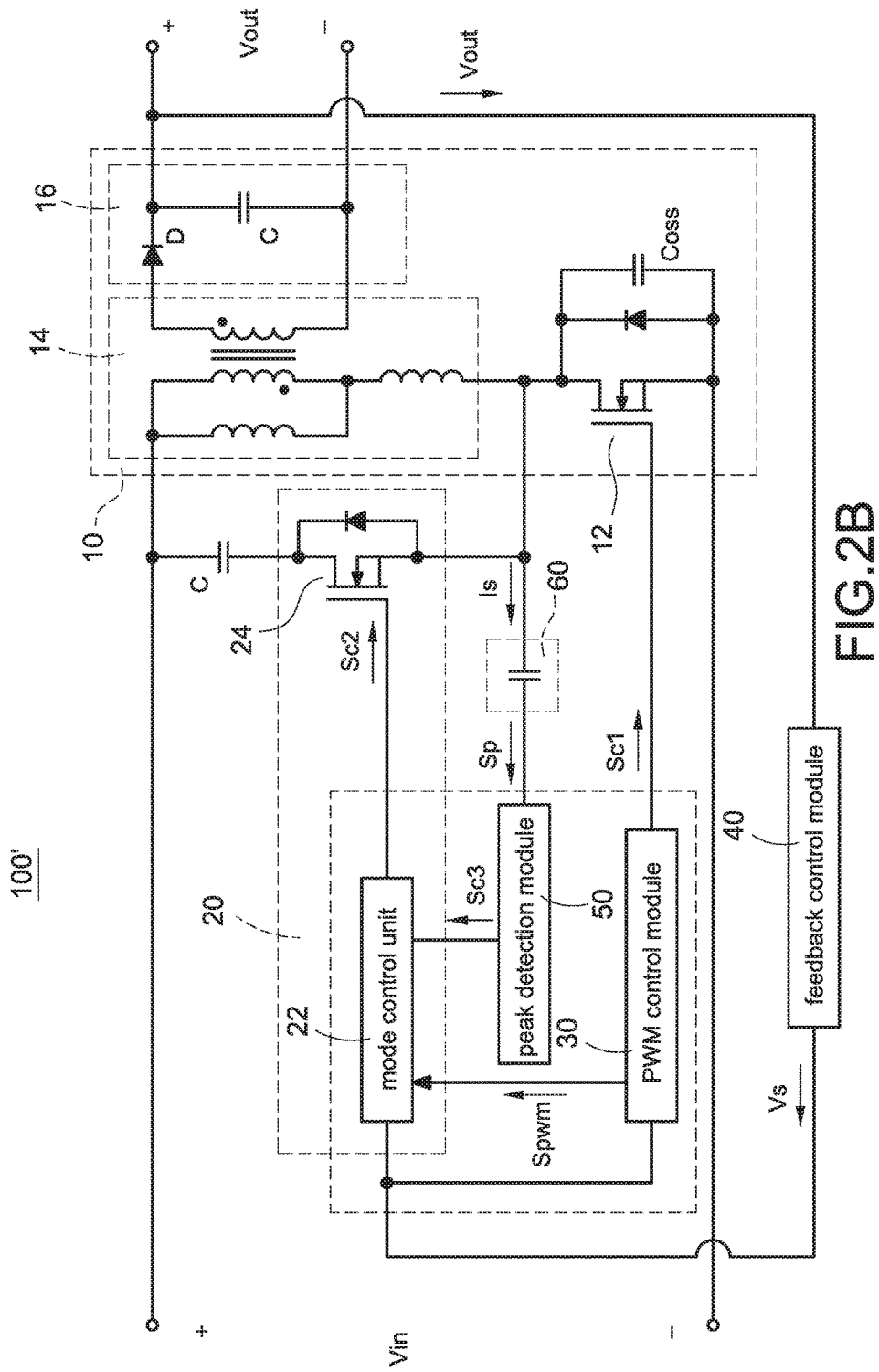
FIG. 2B is a detailed circuit block diagram in FIG. 2A.

Please refer to FIG. 2B, which shows a detailed circuit block diagram in FIG. 2A. Also, refer to FIG. 1A, FIG. 1B, and FIG. 2A again. The upper peak detection module 60 is coupled to a connection point between the first switching unit 12 and the second switching unit 24. The upper peak detection module 60 provides the pulse signal Sp according to the switch current Is flowing through (from or to) the connection point, and outputs the pulse signal Sp to the peak detection module 50. The peak detection module 50 produces the third control signal Sc3 according to the pulse signal Sp, outputs the third control signal Sc3 to the mode control unit 22, and controls the mode control unit 22 to output or not to output the second control signal Sc2 to the second switching unit 24. Since the connection relationship and signal transmission among the clamp conversion circuit 10, the PWM control module 30, and the feedback control module 40 are identical to that shown in FIG. 1B, the detail description is omitted here for conciseness. In the first embodiment shown in FIG. 1A and the second embodiment shown in FIG. 1B, the clamp conversion circuit 10 is, for example but not limited to, mainly based on the flyback converter. In other words, other converter topologies may be implemented for clamp mode switching by enabling or disabling the switching circuit module 20. In one embodiment, the mode control unit 22, the PWM control module 30, and the peak detection module 50 may be, for example but not limited to, integrated into a single integrated circuit (IC) or made of electronic components.

Furthermore, in a transient of the conversion between the active clamp mode and the non-active clamp mode, the first switching unit 12 may be damaged due to a voltage surge caused from instantaneously turning on the second switching unit 24. Because of inherent characteristics of the diode, a parasitic diode of the first switching unit 12, which was originally turned on, is forcibly turned off to prevent the primary side of the transformer unit 14 from being short circuit since the first switching unit 12 and the second switching unit 24 are simultaneously turned on when the second switching unit 24 is instantaneously turned on. Therefore, a large reverse biased current flows through the parasitic diode when the parasitic diode of the first switching unit 12 is forcibly turned off, thereby producing the voltage surge across two ends, namely the drain and the source of the first switching unit 12. In addition, in order to solve a problem of the electromagnetic interference (EMI), an anti-electromagnetic interference capacitor Coss with a large capacitance value is coupled in parallel to the first switching unit 12. When the second switching unit 24 is turned on, a voltage surge is caused across two ends of the first switching unit 12 by the anti-electromagnetic interference capacitor Coss so that the first switching unit 12 may be damaged due to the voltage surge. In the second embodiment, therefore, the power conversion system 100' further provides a peak detection module 50 and an upper peak detection module 60 for detecting a voltage amplitude across the first switching unit 12. When the voltage amplitude across the first switching unit 12 is greater than or equal to an upper peak value, the second switching unit 24 is turned on, thereby preventing the surge voltage from damaging the first switching unit 12.

More specifically, when the mode control unit 22 determines that the output power source Vout is converted from the light-loading condition to the over light-loading condition or from the over light-loading condition to the light-loading condition according to the feedback voltage Vs, the peak detection module 50 determines whether of a signal value of the pulse signal Sp is greater than or equal to the upper peak value. When the peak detection module 50 detects the pulse signal Sp to realize that an output voltage, namely a drain-source voltage of the first switching unit 12 is greater than or equal to the upper peak value, the peak detection module 50 outputs the enabled third control signal Sc3 to the mode control unit 22. When the mode control unit 22 receives the enabled third control signal Sc3, the mode control unit 22 outputs the second control signal Sc2 to the second switching unit 24 so that the clamp conversion circuit 10 operates from the non-active clamp mode to the active clamp mode or from the active clamp mode to the non-active clamp mode. When the peak detection module 50 detects that signal value of the pulse signal Sp is less than the upper peak value, the peak detection module 50 outputs the disabled third control signal Sc3 to the mode control unit 22. When the mode control unit 22 receives the disabled third control signal Sc3, the mode control unit 22 does not output the second control signal Sc2 so that the second switching unit 24 is continuously disabled and the clamp conversion circuit 10 waits for the conversion opportunity between the non-active clamp mode and the active clamp mode. In one embodiment, a non-polar capacitor is, for example but not limited to, used as the upper peak detection module 60. In other words, the upper peak detection module, which can detect whether the signal value of the pulse signal Sp is greater than or equal to the upper peak value, should be embraced within the scope of the present disclosure.

Figure 3:
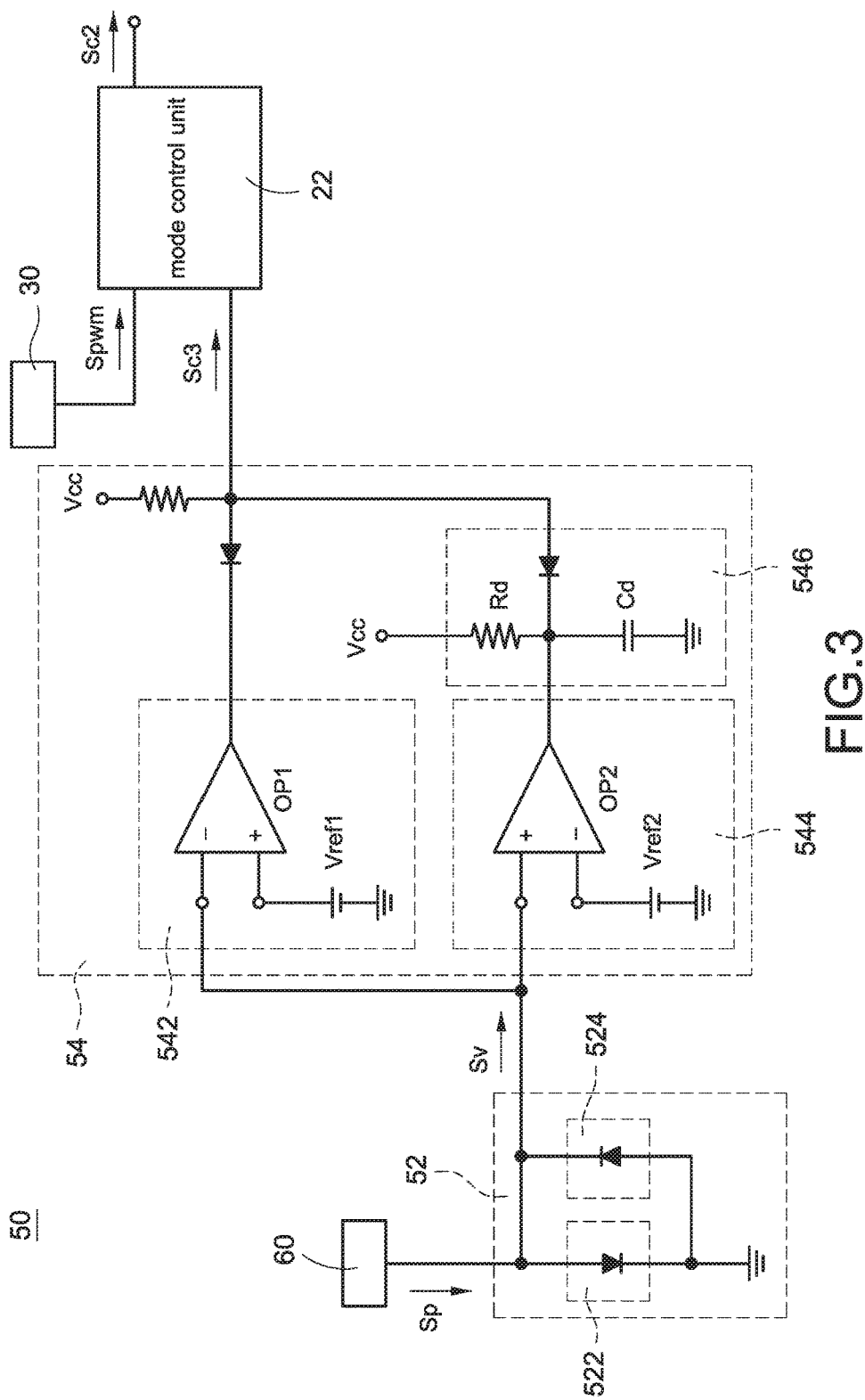
FIG. 3 is a detailed circuit block diagram of a peak detection module according to the present disclosure.

Please refer to FIG. 3, which shows a detailed circuit block diagram of a peak detection module according to the present disclosure. Also, refer to FIG. 2A and FIG. 2B again. The peak detection module 50 includes a voltage control module 52 and a voltage determination module 54. The voltage control module 52 is coupled to the upper peak detection module 60 and the voltage determination module 54, and the voltage determination module 54 is coupled to the mode control unit 22. The voltage control module 52 receives the pulse signal Sp and transmits a voltage signal Sv to the voltage determination module 54. The voltage determination module 54 receives the voltage signal Sv and outputs the enabled third control signal Sc3 or the disabled third control signal Sc3 to the mode control unit 22 according to the voltage signal Sv.

The voltage control module 52 has a first voltage control unit 522 and a second voltage control unit 524. The first voltage control unit 522 is coupled to the upper peak detection module 60, the voltage determination module 54, and a ground end; the second voltage control unit 524 is coupled in parallel to the first voltage control unit 522. After the upper peak detection module 60 receives the switch current Is of the clamp conversion circuit 10, the upper peak detection module 60 produces the sinusoidal or quasi-sinusoidal pulse signal Sp. During a rising slope, namely a positive slope of a waveform of the pulse signal Sp, the first voltage control unit 522 is turned on and the second voltage control unit 524 is turned off. When the first voltage control unit 522 is turned on and the second voltage control unit 524 is turned off, the voltage control module 52 produces the voltage signal Sv with a positive voltage value and outputs the voltage signal Sv to the voltage determination module 54. On the contrary, during a falling slop, namely a negative slope of the waveform of the pulse signal Sp, the first voltage control unit 522 is turned off and the second voltage control unit 524 is turned on. When the first voltage control unit 522 is turned off and the second voltage control unit 524 is turned on, the voltage control module 52 produces the voltage signal Sv with a negative voltage value and outputs the voltage signal Sv to the voltage determination module 54. In addition, when the signal value of the pulse signal Sp is greater than or equal to the upper peak value or the signal value of the pulse signal Sp is less than or equal to a lower peak value, both the first voltage control unit 522 and the second voltage control unit 524 are turned off. When the first voltage control unit 522 and the second voltage control unit 524 are both turned off, the voltage control module 52 produces the voltage signal Sv with a low voltage value and outputs the voltage signal Sv to the voltage determination module 54. In this embodiment, the first voltage control unit 522 and the second voltage control unit 524 are, for example but not limited to, diodes, and the second voltage control unit 524 is coupled in anti-parallel to the first voltage control unit 522, namely an anode of the first voltage control unit 522 is coupled to a cathode of the second voltage control unit 524, and a cathode of the first voltage control unit 522 is coupled to an anode of the second voltage control unit 524. In other words, the first voltage control unit and the second voltage control unit, which can detect whether the signal value of the pulse signal Sp is the rising/falling slope, greater/less than or equal to the upper/lower peak value and output corresponding voltage signal Sv, should be embraced within the scope of the present disclosure.

The voltage determination module 54 includes a first comparison unit 542, a second comparison unit 544, and a delay module 546. The first comparison unit 542 is coupled to the voltage control module 52 and the mode control unit 22, the second comparison unit 544 is coupled to the voltage control module 52, the first comparison unit 542 and the delay module 546, and the delay module 546 is coupled to the mode control unit 22. More specifically, one input end (first input end) of the first comparison unit 542 and one input end (first input end) of the second comparison unit 544 are coupled to the voltage control module 52 and receive the voltage signal Sv. The other input end (second input end) of the first comparison unit 542 is coupled to a first reference voltage Vref1 and the other input end (second input end) of the second comparison unit 544 is coupled to a second reference voltage Vref2. In this embodiment, the first reference voltage Vref1 is greater than the second reference voltage Vref2. In this embodiment, the first reference voltage Vref1 is set to 0.2 volts and the second reference voltage Vref2 is set to zero volt. An output end of the first comparison unit 542 is coupled to the mode control unit 22, and the delay module 546 is coupled between an output end of the second comparison unit 544 and the mode control unit 22.

More specifically, during the rising slope of the waveform of the pulse signal Sp and the voltage signal Sv with the positive voltage value outputted from the voltage control module 52 is provided to the first input end of the first comparison unit 542 and the first input end of the second comparison unit 544, the voltage signal Sv with the positive voltage value is greater than the first reference voltage Vref1 (0.2 volts) and the second reference voltage Vref2 (zero volt). When the voltage signal Sv is greater than the first reference voltage Vref1 and the second reference voltage Vref2, the first comparison unit 542 outputs a disabled signal, such as a logic low-level signal and the second comparison unit 544 outputs an enabled signal, such as a logic high-level signal. At this time, the voltage determination module 54 produces a disabled third control signal Sc3, such as a logic low-level signal according to the disabled signal outputted from the first comparison unit 542 and the enabled signal outputted from the second comparison unit 544, and outputs the disabled third control signal Sc3 to the mode control unit 22, and therefore the mode control unit 22 disables the second switching unit 24.

During the falling slope of the waveform of the pulse signal Sp and the voltage signal Sv with the negative voltage value outputted from the voltage control module 52 is provided to the first input end of the first comparison unit 542 and the first input end of the second comparison unit 544, the voltage signal Sv with the negative voltage value is less than the first reference voltage Vref1 (0.2 volts) and the second reference voltage Vref2 (zero volt). When the voltage signal Sv is less than the first reference voltage Vref1 and the second reference voltage Vref2, the first comparison unit 542 outputs an enabled signal, such as a logic high-level signal and the second comparison unit 544 outputs a disabled signal, such as a logic low-level signal. At this time, the voltage determination module 54 produces a disabled third control signal Sc3, such as a logic low-level signal according to the enabled signal outputted from the first comparison unit 542 and the disabled signal outputted from the second comparison unit 544, and outputs the disabled third control signal Sc3 to the mode control unit 22, and therefore the mode control unit 22 disables the second switching unit 24.

Furthermore, when the signal value of the pulse signal Sp is greater than or equal to the upper peak value to make the voltage signal Sv with the low voltage value outputted from the voltage control module 52 be provided to the first input end of the first comparison unit 542 and the first input end of the second comparison unit 544, the voltage signal Sv with the low voltage value is between the first reference voltage Vref1 and the second reference voltage Vref2. When the voltage signal Sv is between the first reference voltage Vref1 and the second reference voltage Vref2, both the first comparison unit 542 and the second comparison unit 544 output the enabled signals. At this time, the voltage determination module 54 produces an enabled third control signal Sc3, such as a logic high-level signal according to the enabled signals outputted from the first comparison unit 542 and the second comparison unit 544, and outputs the enabled third control signal Sc3 to the mode control unit 22, and therefore the mode control unit 22 enables the second switching unit 24.

Furthermore, when the signal value of the pulse signal Sp is less than or equal to the lower peak value to make the voltage signal Sv with the low voltage value outputted from the voltage control module 52 be provided to the first input end of the first comparison unit 542 and the first input end of the second comparison unit 544, the voltage signal Sv with the low voltage value is between the first reference voltage Vref1 and the second reference voltage Vref2. When the voltage signal Sv is between the first reference voltage Vref1 and the second reference voltage Vref2, the first comparison unit 542 outputs the enabled signal. When the falling slope of the waveform of the pulse signal Sp and the signal value of the pulse signal Sp is greater than the lower peak value, the second comparison unit 544 outputs the disabled signal. Afterward, when the falling slope of the waveform of the pulse signal Sp and the signal value of the pulse signal Sp is less than or equal to the lower peak value, the second comparison unit 544 outputs the enabled signal instead of the disabled signal, that is, the delay module 546 is used to convert the disabled signal into the enabled signal by gradually a charging operation. In this embodiment, the delay module 546 includes a delay resistor Rd and a delay capacitor Cd. By charging the delay capacitor Cd by a power source voltage Vcc, the delay resistor Rd and the delay capacitor Cd are used to determine a RC charging time to be as a delay time for the delay module 546. Hence, the disabled signal outputted from the second comparison unit 544 is converted into a delay enabled signal in the RC charging time by charging the delay capacitor Cd of the delay module 546 by the power source voltage Vcc. At this time, the voltage determination module 54 produces the disabled third control signal Sc3 according to the enabled signal outputted from the first comparison unit 542 and the delay enabled signal outputted from the second comparison unit 544. Also, the voltage determination module 54 outputs the disabled third control signal Sc3 to the mode control unit 22 so that the mode control unit 22 disables the second switching unit 24. Accordingly, the delay enabled signal converted by the delay module 546 is provided when the value of the pulse signal Sp is less than or equal to the lower peak value so as to prevent the voltage surge caused from instantaneously turning on the second switching unit 24.

In this embodiment, the either the first comparison unit 542 or the second comparison unit 544 is, for example but limited to, a comparator implemented by an operational amplifier (OPA). In other words, the voltage determination module, which can detect whether the signal value of the pulse signal Sp is the rising/falling slope, greater/less than or equal to the upper/lower peak value, should be embraced within the scope of the present disclosure. In addition, the delay module 546 is, for example but not limited to, composed of the relay resistor Rd and the delay capacitor Cd coupled in series to the delay resistor Rd. In other words, the delay module, which can detect that the signal value of the pulse signal Sp is less than or equal to the lower peak value, should be embraced within the scope of the present disclosure.

Figure 4:
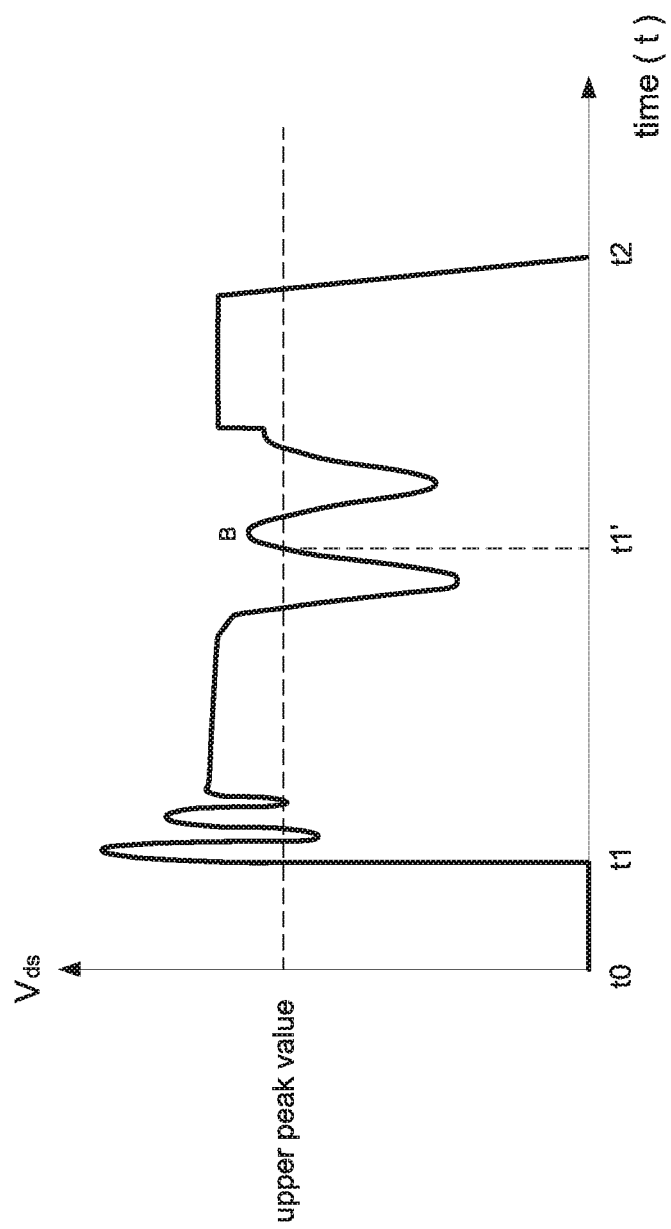
FIG. 4 is a schematic waveform of a first switching unit according to the second embodiment of the present disclosure.

Please refer to FIG. 4, which shows a schematic waveform of a first switching unit according to the second embodiment of the present disclosure. Also, refer to FIG. 2A, FIG. 2B, and FIG. 3 again. In particular, a waveform of the drain-source voltage Vds of the first switching unit 12 is shown in FIG. 4. When the first switching unit 12 is turned off during a time t1 and a time t2, the drain-source voltage Vds is produced between the drain and the source of the first switching unit 12. During the time t1 and the time t2, when the clamp conversion circuit 10 operates from the non-active clamp mode to the active clamp mode, the voltage determination module 54 controls the voltage signal Sv being between the first reference voltage Vref1 and the second reference voltage Vref2, that is, the signal value of the pulse signal Sp is greater than or equal to the upper peak value shown in a horizontal dotted line in FIG. 4. At this time, the mode control unit 22 controls the second switching unit 24 to be turned on at a position B to prevent the voltage surge caused from instantaneously turning on the second switching unit 24 to damage the first switching unit 12. In particular, in order to prevent the primary side of the clamp conversion circuit 10 from being short circuit since a voltage difference, namely a drain-source voltage across the drain and the source of the first switching unit 12 is initially built at the time t1, a delay time, namely time t1 to time t1' is introduced between the built drain-source voltage (at time t1) and the turned-on second switching unit 24 (at time t1'). The detail descriptions of the delay time and the upper peak value are omitted here for conciseness.

In conclusion, the present disclosure has following features and advantages:

1. The power conversion system can operate either in the non-active clamp mode due to the light-loading condition or in the active clamp mode due to the over light-loading condition, thereby increasing overall operation efficiency of the power conversion system.

2. The peak detection module is provided to turn on the second switching unit during the conversion transition between the active clamp mode and the non-active clamp mode, thereby preventing the surge voltage from damaging the first switching unit.

3. The peak detection module is made of simple electronic components, such as operational amplifiers (comparators) and diodes to easily detect whether the signal value of the pulse signal reaches to the upper peak value or the lower peak value, thereby saving circuit costs and simplifying circuit operations.

4. The delay time is introduced between the built drain-source voltage and the turned-on second switching unit, thereby preventing the primary side of the clamp conversion circuit from being short circuit since the drain-source voltage is initially built.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power conversion system with clamp mode switching, comprising:
   a clamp conversion circuit, operating in an active clamp mode or a non-active clamp mode;
   a switching circuit module comprising a switching unit, the switching unit coupled to the clamp conversion circuit;
   a pulse-width modulation control module, coupled to the switching circuit module and the clamp conversion circuit; and
   a feedback control module, coupled to the switching circuit module, the pulse-width modulation control module, and the clamp conversion circuit;
   wherein when the feedback control module is configured to transmit a feedback voltage to the switching circuit module and the pulse-width modulation control module, the pulse-width modulation control module is configured to stabilize the feedback voltage, and the switching circuit module is configured to switch the clamp conversion circuit to operate in the active clamp mode or the non-active clamp mode according to the feedback voltage;
   wherein when the feedback voltage is at a light-loading condition, the switching circuit module disables the switching unit so that the clamp conversion circuit operates in the non-active clamp mode.

2. The power conversion system in claim 1, further comprising:
   a peak detection module, coupled to the switching circuit module;
   wherein when the feedback voltage is at the light-loading condition and the peak detection module is configured to detect an upper peak value, the switching circuit module enables the switching unit to switch the clamp conversion circuit operating from the non-active clamp mode to the active clamp mode.

3. The power conversion system in claim 2, further comprising:
   an upper peak detection module, coupled to the peak detection module;
   wherein the upper peak detection module is configured to transmit the upper peak value to the peak detection module according to a switch current of the clamp conversion circuit.

4. The power conversion system in claim 2, wherein the peak detection module comprises:
   a voltage control module, coupled to the clamp conversion circuit; and
   a voltage determination module, coupled to the voltage control module and the switching circuit module;
   wherein the voltage control module is configured to detect the upper peak value and transmit a voltage signal to the voltage determination module, and the switching circuit module enables or disables the switching unit according to a determination result generated from the voltage determination module.

5. The power conversion system in claim 4, wherein the voltage control module comprises:
   a first voltage control unit, coupled to the clamp conversion circuit and the switching circuit module; and
   a second voltage control unit, coupled to the clamp conversion circuit and the switching circuit module;
   wherein when the voltage control module detects the upper peak value, both the first voltage control unit and the second voltage control unit are not conducted.

6. The power conversion system in claim 4, wherein the voltage determination module comprises:
   a first comparison unit, coupled to the voltage control module and the switching circuit module;
   a second comparison unit, coupled to the voltage control module; and
   a delay module, coupled to the second comparison unit and the switching circuit module;
   wherein when the voltage control module detects the upper peak value, the first comparison unit is configured to output a first enabled signal according to the voltage signal, and the second comparison unit is configured to output a second enabled signal through the delay module; the switching circuit module enables the switching unit according to the first enabled signal and the second enabled signal.

7. The power conversion system in claim 6, wherein when the voltage control module detects a lower peak value, the first comparison unit outputs the first enabled signal, and the second comparison unit outputs a delay enabled signal through the delay module; the switching circuit module disables the switching unit according to the first enabled signal and the delay enabled signal.

8. The power conversion system in claim 6, wherein the first comparison unit provides a first reference voltage, and the second comparison unit provides a second reference voltage; the first reference voltage is greater than the second reference voltage.

9. The power conversion system in claim 8, wherein when the voltage control module detects the upper peak value, the voltage control module controls the voltage signal to be between the first reference voltage and the second reference voltage.

* * * * *